Jan. 16, 1934.   R. RIBEROLLES   1,943,397
APPARATUS FOR DETERMINING THE COURSE AND SPEED OF AIRCRAFT
Filed July 18, 1931   3 Sheets-Sheet 1
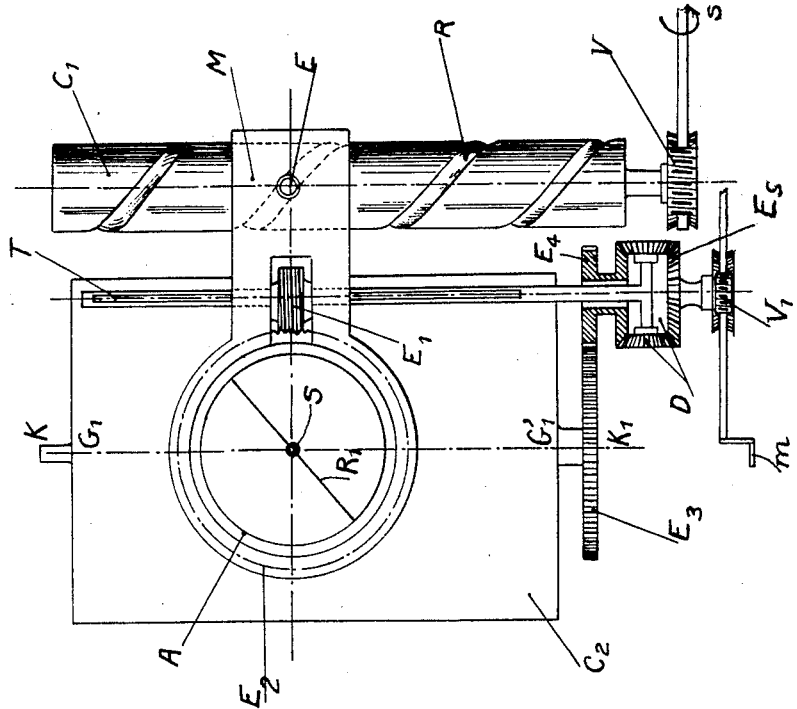
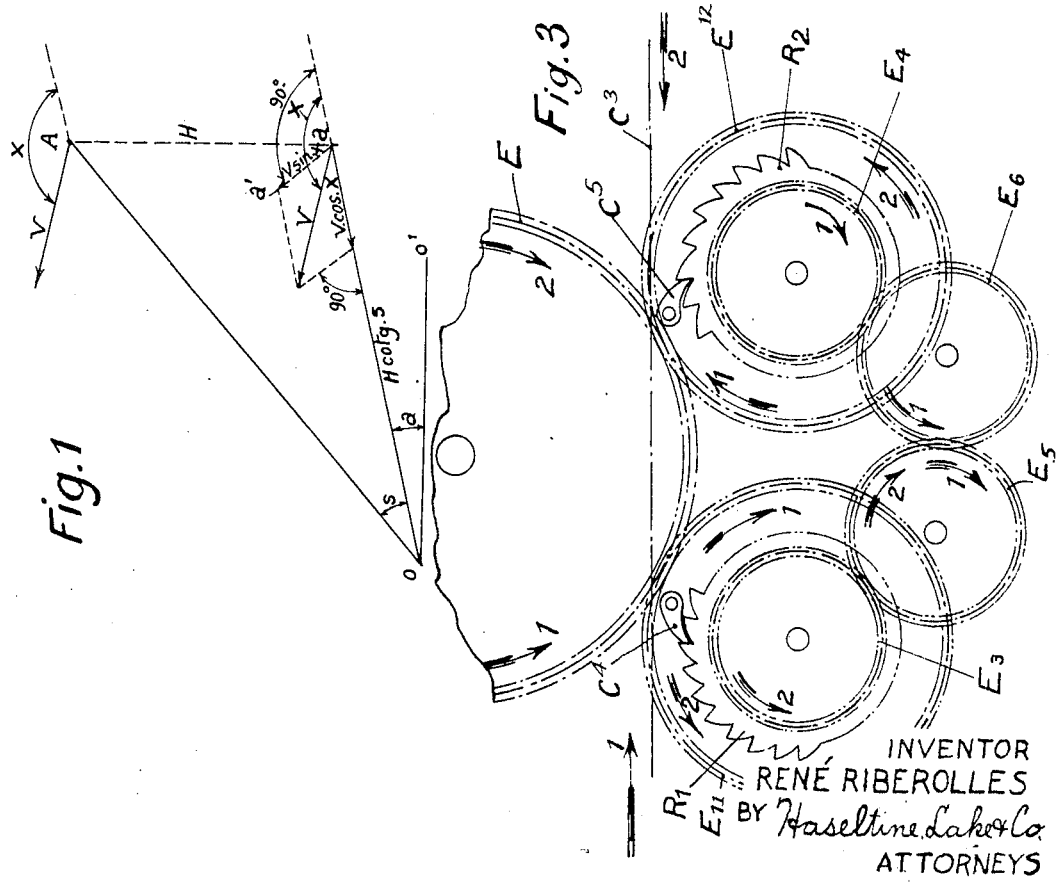
INVENTOR
RENÉ RIBEROLLES
BY Haseltine Lake & Co.
ATTORNEYS Jan. 16, 1934.   R. RIBEROLLES   1,943,397
APPARATUS FOR DETERMINING THE COURSE AND SPEED OF AIRCRAFT
Filed July 18, 1931   3 Sheets-Sheet 2
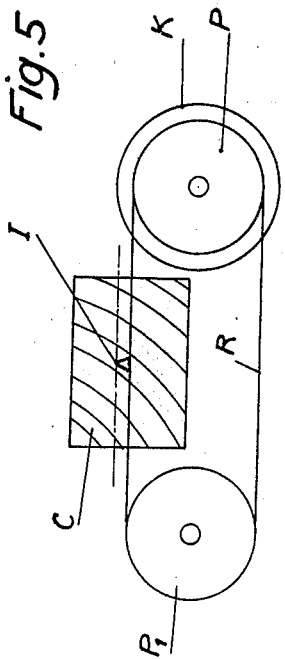
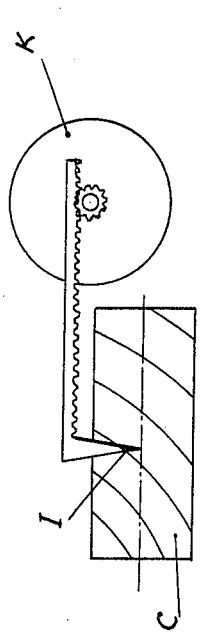
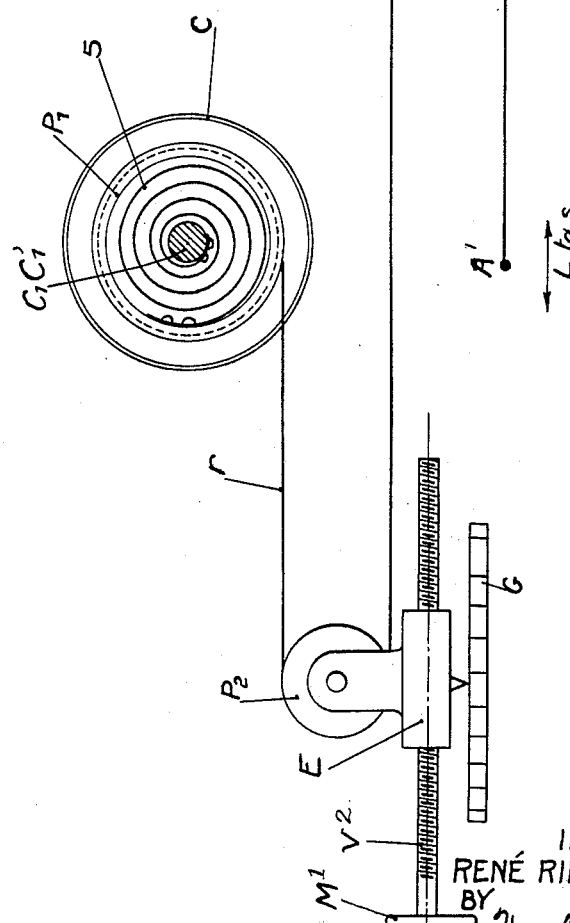
INVENTOR
RENÉ RIBEROLLES
BY Haseltine Lake & Co.
ATTORNEYS

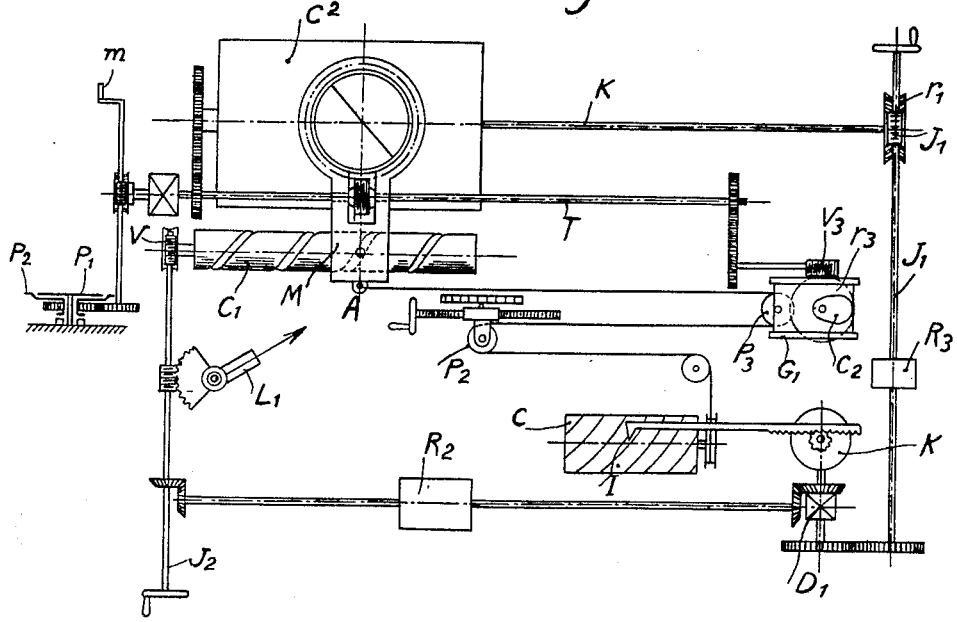

Patented Jan. 16, 1934

1,943,397

UNITED STATES PATENT OFFICE 1,943,397

APPARATUS FOR DETERMINING THE COURSE AND SPEED OF AIRCRAFT

René Riberolles, Paris, France

Application July 18, 1931, Serial No. 551,726, and in France August 6, 1930

8 Claims. (Cl. 235—61.5)

The object of the present invention is to provide a device permitting the speed of an aerial target such as aircraft to be determined in magnitude and direction, assuming the altitude to be known and constant, the observer following the target with a continuous aim in sight and azimuth by means of telescopes or sighting devices of any kind.

A further object of the invention is to correct the course of the aircraft with respect to the ground, taking into account the speed of the wind, in order to obtain the absolute speed of the aircraft with respect to the air.

A still further object of the invention is to construct an apparatus for tracing curves the inclination of which gives a measurement of the angle made by the course with the vertical plane of sight.

An apparatus according to the invention is illustrated by way of example in the accompanying drawings, in which:

Figure 1 is an explanatory diagram.

Figure 2 is a detail view of the mechanism permitting the angle made by the course of the target with the vertical plane of sight to be materialized, and Figure 3 is a view of the rectifying mechanism.

Figures 4 and 5 illustrate two forms of construction of a speed counter.

Figure 6 shows a device permitting the algebraic sum of different vectors of the course to be obtained.

Figure 7 shows a general arrangement of the apparatus forming the subject of the invention.

In Figure 1, which is a perspective view, $o$ represents the observer, A the aerial target, $a$ its horizontal projection on the horizontal plane of the observer.

It is assumed always hereinafter that the target moves at a constant and known altitude.

$$Aa = H = a \text{ constant}$$

The course V of the target will thus be horizontal; it will be equal to its projection on the horizontal plane of the observer.

Let $x$ be the angle made by this course with the vertical plane of $Aa$ passing through the observer, then $x$ is also the angle made by the projection of the course V with the trace of the plane $oAa$, that is to say the straight line $oa$.

Let S be the angle of sight of the target and $a$ the azimuth position of this target measured from any line of origin $oo$.

Assume a telescopic sight to be placed at $o$ and directed on the target continuously by the combined effect of two rotations, one in sight about a horizontal axis and the other in azimuth about a vertical axis.

The mechanism controlling the first movement will at each moment have a speed of rotation proportional to the angular speed in site of the target $$V_s = \frac{dS}{dt}.$$

Similarly the speed of rotation of the mechanism controlling the second movement will be proportional to the angular speed of the target in azimuth $$V_a = \frac{da}{dt}.$$

Moreover, in the right-angled triangle oAa $$oa = H \cot s$$

If the speed V is projected on the horizontal plane upon the straight line $oa$ and upon the straight line $aa'$, traced out by the point $a$ perpendicularly to $oa$, vectors are obtained which are respectively equal to $$V \cos X \text{ and } V \sin X$$

But V sin X is itself the linear speed of the point A at right angles to the radius oA or of the point $a$ at right angles to the radius $oa$. That is to say we can write:

$$(1) \ V \sin X = oa \frac{da}{dt} = H \cot s \frac{da}{dt}$$

Similarly $$(2) \ V \cos X = \frac{doa}{dt} = \frac{dH \cot s}{dt} = H \cot s \frac{dL \tan s}{dt}$$

From which, by dividing equation (1) by equation (2), we have $$(3) \ \tan X = \frac{-da}{dL \tan s}$$

L being the symbol of napierian logarithms.

By adding on the contrary the absolute values we obtain:

$$V (\sin X + \cos x) = H \cot s \left(\frac{da}{dt} + \frac{dL \tan s}{dt}\right)$$

that is $$V \sin \frac{\pi}{4} \cos \left(\frac{\pi}{4} - x\right) = H \cot s \left(\frac{da}{dt} + \frac{dL \tan s}{dt}\right)$$

from which we obtain $$V = \frac{H \cot s}{\sqrt{2} \cos \left(\frac{\pi}{4} - x\right)} \left(\frac{da}{dt} + \frac{dL \tan s}{dt}\right)$$

or finally $$(4) \ V = f\left\{\left[LH - L \tan s - L\sqrt{2} \cos \left(\frac{\pi}{4} - x\right)\right]\left[\frac{da}{dt} + \frac{dL \tan s}{dt}\right]\right\}$$

To sum up:

Equation (3) gives the direction of the course of the target; equation (4) gives the magnitude of the speed.

The entire arrangement is illustrated in Figure 7 providing for the determination of all the elements of the course of the aircraft, that is, the simultaneous measurement of the angle X of the course thereof relative to the vertical plane of sight and the value V of this course. The device shown in Figure 2 is that part of the apparatus which renders it possible to materialize the mentioned angle X of the course with said vertical plane of sight, the angle X being given by the formula (3);

$$(3) \tan x = -\frac{da}{D L \tan s}$$

In this figure $C_1$ is a cylinder turning through the site angles $s$ by means of a worm V connected to the site control member. On this cylinder is traced a helical groove R having a variable pitch. On the cylinder slides a sleeve M within which projects a stud E of diameter equal to the width of the groove. The sleeve M is guided by a rod $t$ or the like parallel to the axis of the cylinder, so that it cannot turn. The helix is given a pitch such that, by rotating the site cylinder $C'$ in sight S the displacement of the stud E and consequently of the sleeve M will be proportional to $L \tan s$.

It is to be noted that within the usual limits of aiming in site, that is to say between 10° and 80°, the variations of $L \tan s$ are very favorable in obtaining a good construction of the groove.

It is easily shown that the variations in the pitch are symmetrical relative to the site angle 45° which is the middle of the field.

The rod T is cylindrical; it is grooved in the direction of its length and by means of a key produces the rotation of the helical or equivalent gear $E_1$ which itself drives a toothed wheel $E_2$ turning in a support rigid with a sleeve M.

A cylindrical ring A which forms part of $E_2$ and enables it to turn in its support, carries a transparent base made of glass, celluloid or the like, beneath which is traced a reference line $R_1$ along a diameter of this ring.

At its centre, that is to say at the centre of the ring A is secured a tracing stylus S.

Vertically below this stylus is situated the axis of a cylinder $C_2$ which is at the same time parallel to the axis of the cylinder $C_1$ and turns in azimuth by means of a mechanical transmission interposed between this cylinder $C_1$ and the displacement mechanism in azimuth of the gun.

The stylus S bears upon this cylinder and traces a line on it.

By suitably choosing the ratios of the mechanism, it is seen that the angle of the tangent to the curve traced will make an angle equal to $$\frac{da}{dL \tan s}$$

with the generating line of the cylinder, that is to say equal to $x$, the angle made by the course with the vertical plane of sight.

This direction can be materialized by placing the reference line $R_1$ tangentially to the curve.

The cylinder $C_2$ which turns in azimuth carries a toothed wheel which meshes with the toothed wheel $E_4$ rigid with one of the planet wheels of the differential D.

The other planet wheel $E_5$ is rigid with a worm wheel driven by the worm $V_1$ actuated by hand by means of the crank handle $m$.

The rod T is rigid with the satellite wheels of the differential.

The ratios between the toothed wheels are so chosen that, under the action of the control in azimuth only, the reference line $R_1$ turns through one turn for 360° of azimuth and moves in the same direction as the tangent to the curve traced.

It is easy to see that under these conditions, if the handle $m$ is turned so as to bring the reference line $R_1$ on to the tangent to the curve, the rotation of this handle will be proportional to the angle made by the course with the origin of the azimuths. Further, the rod T will have turned proportionally to the angle $x$ made by the course with the vertical plane of sight. The rotations of the handle $m$ and of the rod T may be employed for controlling the mechanisms described hereinafter.

These rotations may also be associated with graduated dials which will allow the angle made by this course with the vertical plane of sight or with the origin of the azimuths to be read.

The devices shown in Figures 3 to 6 permit the speed V to be materialized in conformity to the formula established above.

$$(4)\ V = f\left\{\left[\left(LH - L\tan s - L\sqrt{2}\cos\left(\frac{\pi}{4} - x\right)\right)\right]\left(\frac{da + dL \tan s}{dt}\right)\right\}$$

In order to embody this complex function:
1.

$$\cos\left(\frac{\pi}{4} - x\right)$$

will be expressed as an absolute value; that is to say the value taken for $x$ will always be the value of the acute angle which the direction of speed makes with the horizontal projection of the line of sight.

2. $da$ and $dL \tan s$ will also be taken in absolute values.

3. By means of a differential, movements proportional to the absolute values of $a$ and $L \tan s$ will be added and the sum will be made to act upon a speed counter of any known type which will give $$\frac{da + dL \tan s}{dt}.$$

4. The counter will move a pointer along the generating line of a cylinder or along the radius of a disc turning proportionally to:

$$LH - L \tan s - L\sqrt{2} \cos\left(\frac{\pi}{4} - x\right)$$

Suitable curves traced on this cylinder or on this disc will permit the value of V to be read as given by equation (4).

The arrangement shown in Figs. 3 to 5 constitutes a part of the whole apparatus shown in Fig. 7, this partial arrangement rendering possible the materialization of the factor $$\frac{da + dLtgs}{dt}$$

In Figure 3:

$E_{11}$, $E_{12}$ are equal spur gears simultaneously meshing with the control member which may be the toothed wheel E or the rack $C_3$. These toothed wheels carry pawls $C_4$, $C_5$ arranged in opposite directions and engaging with ratchet wheels $R_1$ $R_2$ mounted upon the same shafts as the wheels $E_{11}$ $E_{12}$ and loose upon these shafts. The ratchet teeth are only shown over a part of the periphery of the wheels but it is clearly understood that in practice the teeth are continuous.

Toothed wheels $E_3$ $E_4$ are rigid respectively with the wheels $R_1$ $R_2$ and mesh with equal toothed wheels $E_5$ $E_6$ which also mesh with each other.

It is easy to see that, whatever be the direction of displacement of the control $C_3$ or $E$, the wheels $E_5$ $E_6$ will always turn in the same direction, by virtue of the action of the ratchets. The wheel $R_2$ is the driving wheel for the direction marked 1. For the direction marked 2 the wheel $R_1$ is the driving wheel.

If they actuate another mechanism they therefore also drive it always in the same direction. In other words, they will have rectified the movement of the control member when the latter has changed in direction.

The rectifying mechanism shown in Figure 3 may be controlled by a rack or a spur toothed wheel or analogous means indifferently.

The remarks which have been made with respect to the small variations in the pitch of the helix on the cylinder representing $L \tan s$ ($C_1$ Figure 2) permit us to conclude that the mechanism may without difficulty and according to one feature of the invention, control, through the medium of a rectifying device and a differential of any kind, the movement of a speed counter which may also be of any known kind.

This differential interposed between the adjuster of the movement proportional to $L t_g s$ and the counter receives, on the other hand, a movement equally adjusted and proportional to the azimuth $a$. Under these conditions the differential will make the sum of these two rectified movements and will transmit this sum of movements to the counter which will indicate the sum of the absolute values:

$$\frac{da + dLt\dot{g}s}{dt}$$

The devices shown in Figures 4 and 5 comprise a cylinder C rotating proportionally to the sum:

$$LH - L \tan s - L\sqrt{2} \cos\left(\frac{\pi}{4} - x\right)$$

in equation 4.

A pointer I connected by a rack to a counter K such as that described above moves along the generating line of this cylinder. The value of the speed as given by equation 4 can be read opposite the pointer I of the grooves suitably traced on the cylinder.

Figure 5 shows a modification in which the pointer I is mounted on a band R turning on pulleys P $P_1$. The pulley $P_1$ is rigid with the counter K.

Figure 6 represents in detail one of the elements of the complete arrangement of Figure 7, which relative to the aggregate, is one of the mechanisms which turn the cylinder C of Figures 4 and 5, the extremity of this cylinder being seen in the figure.

On this cylinder is keyed a pulley $P_1$ upon which is fixed a band or the equivalent $r$. A spiral spring S attached to $P_1$ at a fixed point or any equivalent device keeps the band $r$ under tension and returns the cylinder.

The band passes over two pulleys $P_2$ $P_3$ moving in directions parallel to the band and finally its end A is attached to the sleeve M shown in Figure 2.

By means of this connection, the band and the cylinder C thus move proportionally to $L \tan s$.

The pulley $P_2$ is rigid with the nut E of a screw $V_2$ actuated by hand by the crank handle M'. This displacement of E is read on a scale G graduated in logarithms of H.

The pulley $P_3$ is mounted on a slide block $G_3$ guided by slides $G_1$ $G_2$ and actuated by a cam $G_4$ which presses upon a flange or shoulder R on this slide block.

The cam is designed to produce a displacement $$L\sqrt{2} \cos (\pi - x)$$

when it is made to turn in accordance with $x$.

$x$ normally varies from 0° to 360°; in order to take only the absolute value of $$\cos\left(\frac{\pi}{4} - x\right),$$

it will be sufficient to employ a cam making four turns for one turn of $x$ or else a cam turning according to $x$ in which the profile is repeated four times over one revolution.

The first solution gives a very small cam having a profile with very gentle lifts.

It is to be noted that the variations of $$L \cos\left(\frac{\pi}{4} - x\right)$$

are small; the cosine varies only from 0.707 to 1, after which it returns to 0.707, and so on.

In order to obtain a rotation proportional to $x$ it will be sufficient to rotate the cam $C_2$ by means of a differential actuated on the one hand in azimuth and on the other hand according to the angle between the speed and the direction of origin read on the device shown in Figure 2, and transferred to a suitable graduated scale by hand, or to connect it to the rod T shown in Figure 2, which turns in conformity to $x$.

The angular displacement $$\frac{\pi}{4}$$

will thus be given once and for all to the setting of the mechanisms.

When the arrangements described have been constructed, it is clear that the cylinder C will turn proportionally to the sum of the preceding movements, that is:

$$LH - L \tan s - L\sqrt{2} \cos\left(\frac{\pi}{4} - x\right),$$

on condition that suitable directions are chosen for the various movements.

In order to obtain a reading of V, the curves of equal speed obtained from equation (4) are traced on the cylinder C, and V is read directly on these curves as described above.

The speed measured in the foregoing is obviously the speed relative to the ground. If there is any wind and the latter is known in magnitude and direction, the speed of the target relative to the air can be determined.

Figure 7 shows a general arrangement of the apparatus forming the subject of the invention.

As will be seen clearly in this figure, the pointer I which moves over the cylinder C is moved parallel to the axis of the cylinder $c$ by the rack actuated by the counter K. This counter is itself controlled by the differential $D_1$ which gives the sum $da + d L \tan s$.

The factor $da$ is communicated to the differential forming the shaft $J_1$ of the mechanism controlling the azimuths after the interposition of a rectifier $R_3$ such as that described with reference to Figure 3.

The factor $dL \tan s$ is communicated to the differential from the shaft $J_2$ of the mechanism controlling the sites after the interposition of a rectifier $R_2$.

Further, the cylinder $c$ turns through amounts equal to $$LH - L \tan s - L\sqrt{2} \cos\left(\frac{\pi}{4} - x\right).$$

For this purpose the pulley $P_2$ is operated by hand as described above, according to LH.

The cam $C_2$ of the carriage G is driven through a worm wheel $r_3$ keyed on its shaft, and a worm $V_3$ driven by the shaft T upon which slides the sleeve M of the device shown in Figure 2. The cam produces a displacement equal to $$\sqrt{2} \cos\left(\frac{\pi}{4} - x\right).$$

Finally, the end A' of the wire, which must be moved according to $L \tan s$, is connected to this sleeve M.

The aiming telescope $L_1$ is also shown diagrammatically and also its connection with the movement of the sights.

The plate $P_2$ of the wind correction mechanism is controlled by the shaft of the hand lever $m$.

The position of the pointer I on the cylinder C is a function of $$\frac{da + dL \tan s}{dt}$$

on the one hand, and $$LH - L \tan s - L\sqrt{2} \cos\left(\frac{\pi}{4} - x\right)$$

on the other hand.

The curves of equal speeds, which will enable the course of flight to be read, can thus be traced on the cylinder C.

What I claim is:

1. In an apparatus for determining the course and speed of flight of an aircraft making a sight angle and an azimuth angle in travel, and moving at known altitude, the combination of a rotatable tracing cylinder, a telescope adapted to be trained upon the aircraft and movable in azimuth, means connecting said telescope with said tracing cylinder and communicating movements of said telescope in azimuth to said cylinder and rotating the same upon its axis in predetermined relation to said movements and thereby in proportion to the travel of said aircraft, a stylus shiftably disposed upon the generatrix of said cylinder, guide means for guiding said stylus along the generatrix of the cylinder, means also connecting said telescope with said stylus and communicating the movements of the telescope in sight thereto so as to shift the stylus in predetermined relation to said movements and cause the stylus to trace a curve on said cylinder which makes an angle with said generatrix which is equal to the angle made by the course of the aircraft with respect to the vertical plane of sight.

2. In an apparatus for determining the course and speed of flight of an aircraft making a sight angle and an azimuth angle in travel, and moving at known altitude, the combination of a rotatable tracing cylinder, a telescope adapted to be trained upon the aircraft and movable in azimuth and in sight, there being means for driving said telescope in azimuth, mechanical connections associated with the means driving the telescope in azimuth and connected to said tracing cylinder so as to rotate the tracing cylinder upon its axis to an extent which is proportional to the displacement of the aircraft according to the azimuths, a stylus shiftably disposed upon the generatrix of said cylinder, a guide rod disposed parallel to the axis of said cylinder, a slide block carrying said stylus and slidably mounted upon said guide rod for guiding the stylus along the generatrix of the cylinder, a projection mounted upon the slide block, a second rotatable cylinder disposed in parallelism to said tracing cylinder having a helical groove thereon adapted to receive the projection of said slide block, means connecting said telescope and said second cylinder and communicating the movements of the telescope in sight to said second cylinder and through said projection to said stylus in order to shift the latter in predetermined manner and cause the stylus to trace a curve on said cylinder which makes an angle with said generatrix which is equal to the angle made by the course of the aircraft with respect to the vertical plane of sight.

3. In an apparatus for determining the course and speed of flight of an aircraft making a sight angle and an azimuth angle in travel, and moving at known altitude, the combination of a rotatable tracing cylinder, a telescope adapted to be trained upon the aircraft and movable in azimuth, means connecting said telescope with said tracing cylinder and communicating movements of said telescope in azimuth to said cylinder and rotating the same upon its axis in predetermined relation to said movements and thereby in proportion to the travel of said aircraft, a stylus shiftably disposed upon the generatrix of said cylinder, a guide block supporting said stylus shiftable in parallelism with the generatrix of the cylinder and having a transparent base provided with a reference line bisecting the point of contact of the stylus upon said tracing cylinder, a toothed rotatable ring mounted on said guide block for supporting said transparent base, means upon said guide block for rotating said toothed ring including a helical toothed wheel meshing therewith, a shaft parallel with said cylinder guiding said guide block and forming a shaft for said helical toothed wheel, a pair of differential satellite gears rigid with said shaft, a first differential planet gear meshing with said satellite gears, a spur gear rigidly mounted on the shaft of said tracing cylinder and meshing with said planet gear, a second planet gear also meshing with said satellite gears, a hand control means rigid with said second planet gear, means connecting said telescope with said guide block and communicating thereto the movements of said telescope in sight in order to shift said block in predetermined manner and cause said stylus to trace a curve on said cylinder which makes an angle with said generatrix which is equal to the angle made by the course of the aircraft with respect to the vertical plane of sight.

4. In an apparatus for determining the course and speed of flight of an aircraft making a sight angle and an azimuth angle in travel, and moving at known altitude, the combination of a rotatable tracing cylinder, a shiftable pointer located upon said cylinder, means for guiding said pointer in movement along the generatrix of said cylinder, a speed counter connected to said pointer rotating according to the formula $$\frac{da + dL \tan S}{dt}$$

and shifting said pointer in predetermined manner along said generatrix, a mechanism associated with the apparatus rotating according to the formula $$LH - L \tan S - L\sqrt{2} \cos\left(\frac{\pi}{4} - x\right)$$

when assuming that H represents the height of the aircraft and X represents the angle made by the course of said aircraft with respect to the vertical plane of sight, and means connecting said tracing cylinder with said latter mechanism in order to rotate the same thereby in predetermined relation thereto.

5. In an apparatus for determining the course and speed of flight of an aircraft making a sight angle and an azimuth angle in travel, and moving at known altitude, the combination of a rotatable tracing cylinder, a shiftable pointer located upon said cylinder, means for guiding said pointer in movement along the generatrix of said cylinder, a speed counter connected to said pointer rotating according to the formula $$\frac{da + dL \tan S}{dt}$$

resulting in a displacement equivalent to $da$, a mechanism associated with the apparatus making a displacement equal to $dL \tan S$, a movement rectifier associated with both said speed counter and said mechanism adapted to sum up the absolute values of the displacements of said speed counter and said mechanism, means continuously connecting said pointer with said speed counter, a second mechanism also associated with the apparatus rotating according to the formula $$LH - L \tan S - L\sqrt{2} \cos\left(\frac{\pi}{4} - x\right)$$

when assuming that H represents the height of the aircraft and X represents the angle made by the course of said aircraft with respect to the vertical plane of sight, and means connecting said tracing cylinder with said latter mechanism in order to rotate the same thereby in predetermined relation thereto.

6. In an apparatus for determining the course and speed of flight of an aircraft making a sight angle and an azimuth angle in travel, and moving at known altitude, including the combination of a shaft, a cylinder mounted upon said shaft, a spiral spring within said cylinder attached at one end to said shaft and at the other to said cylinder, a pulley fixed to the cylinder having a wire wound thereon and secured thereto, a second pulley spaced in one direction from said first pulley and having said wire passed thereover, a traveling device connected to said second pulley having a displacement equal to LH, a third pulley spaced in another direction from said first pulley, and having said wire passed thereover toward said second pulley, a movable means connected to said third pulley, and shiftable to the amount of $$L\sqrt{2} \cos\left(\frac{\pi}{4} - x\right),$$

and a movable means connected to the end of said wire, whose displacement is equal to L tan S in order to provide for rotation of said cylinder to the extent of $$LH - L \tan S - L\sqrt{2} \cos\left(\frac{\pi}{4} - x\right).$$

7. In an apparatus for determining the course and speed of flight of an aircraft making a sight angle and an azimuth angle in travel, and moving at known altitude, including the combination of a shaft, a cylinder mounted upon said shaft, a spiral spring within said cylinder attached at one end to said shaft and at the other to said cylinder, a pulley fixed to the cylinder having a wire wound thereon and secured thereto, a second pulley spaced in one direction from said first pulley and having said wire passed thereover, an indicating device connected to said second pulley, means preventing rotational displacement of said device, an adjustment screw in said device in parallelism with said wire running from the cylinder to said second pulley, means for turning said screw and displacing said device in the direction of said screw to the amount of LH, a third pulley spaced from said second pulley over which said wire is passed toward said second pulley, a movable means connected to said third pulley and shiftable to the amount of $$L\sqrt{2} \cos\left(\frac{\pi}{4} - x\right),$$

and a movable means connected to the end of said wire, whose displacement is equal to L tan S in order to provide for rotation of said cylinder to the extent of $$LH - L \tan S - L\sqrt{2} \cos\left(\frac{\pi}{4} - x\right).$$

8. In an apparatus for determining the course and speed of an aircraft making a sight angle and an azimuth angle in travel and moving at known altitude, including the combination of a shaft, a cylinder mounted upon said shaft, a spiral spring within said cylinder attached at one end to said shaft and at the other to said cylinder, a pulley fixed to the cylinder having a wire wound thereon and secured thereto, a second pulley spaced in one direction from said first pulley and having said wire passed thereover, an indicating device connected to said second pulley, means preventing rotational displacement of said device, an adjustment screw in said device in parallelism with said wire running from the cylinder to said second pulley, means for turning said screw and displacing said device in the direction of said screw to the amount of LH, a third pulley spaced from said second pulley over which said wire is passed toward said second pulley, a movable slide block carrying said third pulley, means for guiding said slide block in a direction parallel with the portion of the wire extending from said cylinder toward said second pulley, a stop shoulder disposed on said slide block, a rotatable cam engaging against said stop shoulder in order to communicate movement thereto and thereby displace said slide block to the amount equal to $$L\sqrt{2} \cos\left(\frac{\pi}{4} - x\right),$$

and a movable means connected to the end of said wire, whose displacement is equal to L tan S in order to provide for rotation of said cylinder to the extent of $$LH - L \tan S - L\sqrt{2} \cos\left(\frac{\pi}{4} - x\right).$$

RENÉ RIBEROLLES.